(12) United States Patent
Hirano et al.

(10) Patent No.: US 6,687,835 B1
(45) Date of Patent: Feb. 3, 2004

(54) COMMAND AUTHORIZATION METHOD

(75) Inventors: Hideyuki Hirano, Kawasaki (JP);
Takayuki Hasebe, Kawasaki (JP);
Seigo Kotani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/347,406

(22) Filed: Jul. 6, 1999

(30) Foreign Application Priority Data

Sep. 18, 1998 (JP) .......................................... 10-265211

(51) Int. Cl.⁷ ................................................. G06F 11/30
(52) U.S. Cl. ....................................... 713/202; 713/193
(58) Field of Search ................................ 713/200, 202, 713/165, 166, 193; 705/18, 56, 57; 380/44, 46, 263, 241, 242; 369/84, 85

(56) References Cited

U.S. PATENT DOCUMENTS 5,796,943 A  *  8/1998  Fujioka ....................... 713/202
6,112,187 A  *  8/2000  Fukawa ....................... 705/18
6,351,813 B1 *  2/2002  Mooney et al. ............. 713/185

FOREIGN PATENT DOCUMENTS

JP        5-257816        10/1993

OTHER PUBLICATIONS

Bruce Schneier, Applied Cryptography second edition, 1996, pp. 15–17, 173–175.*

* cited by examiner

Primary Examiner—Frantz B. Jean
Assistant Examiner—Hosuk Song
(74) Attorney, Agent, or Firm—Staas & Halsey LLP

(57) ABSTRACT

A command authorization method that prevents a command issued by a third party from impersonating a command issued by a legitimate user, thereby maintaining high security. An authorization code stored in a command transmitted from a host is collated in a command authorization code parser. If the authorization code coincides with collating information therein, a command parser generates a predetermined access command, which is executed by a command controller.

9 Claims, 8 Drawing Sheets

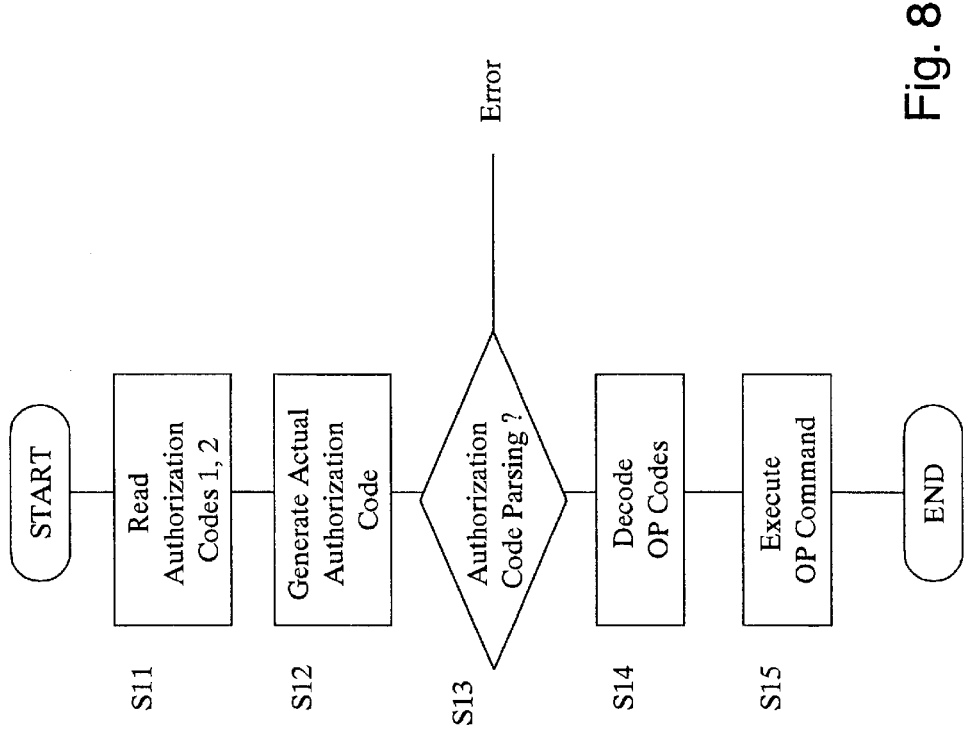

COMMAND AUTHORIZATION METHOD

BACKGROUND OF THE INVENTION

1. Technical Field

The present invention relates to a command authorization method. More specifically, the present invention relates to a command authorization method for discriminating legitimate from illegitimate incoming commands transmitted from an external device such as a computer.

2. Description of Related Art

As recording media onto which a user can freely write data, magneto-optical disks (MO), digital video disks (DVD), floppy disks (FD), and mini disks (MD) are known. The drive device for driving such recording media is generally connected to a computer via a SCSI interface, and writes data onto and reads data from the recording medium according to commands transmitted from the computer.

Normally, a recording medium is provided with a first level that stores a number peculiar to the medium, a second level that stores designated information, and a third level that stores arbitrary electronic data. The first level is a data reading possible, but overwriting impossible area (i.e., read-only). The second level is a read/overwrite by user impossible area. The third level is an area the user can use freely.

To protect copyrights in the electronic data of computer programs and electronic publications, consideration has been given to encrypting the electronic data with a predetermined encryption key and storing it in the third level. The idea in this case is to store permission information in the second level as the basis of the right of access to the electronic data stored in the third level. Based on the permission information a legitimate user can accordingly decode and use the electronic data. Herein, when distributing recording media in which electronic data has been stored, a key for decoding can be stored in the second level as the permission information. Further, wherein a user later obtains right of access for using the electronic data stored onto the recording medium, the configuration may be such that the permission information in the second level is replaced with predetermined data, and the electronic data is decoded.

Wherein this is made the case, it is necessary for the user to send designated commands from the computer end for reading and for writing predetermined information that is stored in the second level. Since the second level of the recording medium is an area into and from which writing/reading by a user is normally not possible, a given command should be executed discriminating whether it is by a legitimate user. Conventionally, the configuration is to establish user passwords, such that wherein a given command is sent from the computer end, the command is transmitted in assigning a relation to the password.

In the foregoing situation, whether a given command is from a legitimate user is discriminated by a command associated with the password independently authorizing the given command. Nevertheless, if a third party parses the command associated with the password, it becomes possible for the given command to issue, deteriorating the security level. Especially, since it is possible to monitor the data bus between the computer and the drive, conceivably it is relatively easy to obtain the password by parsing commands transmitted from the computer.

SUMMARY OF THE INVENTION

An object of the present invention is to maintain high security by a command authorization method that prevents third-party issued commands from impersonating normal commands from a user.

A command authorization method according to the present invention abstracts authorization information from received commands, compares the authorization information with collating information, and executes commands corresponding to the received commands if the authorization information coincides with the collating information.

The command authorization method can be configured such that the authorization information can be abstracted from an authorization codes stored in the received commands.

The command authorization method can also be configured such that the authorization code is a non-repeating number, and the authorization code is renewed each time the commands are transmitted from the transmitting end.

The command authorization method can also be configured such that the authorization codes are generated from time sequence information or random numbers.

The command authorization method can also be configured such that the authorization codes are generated from a random number series table having a coordinate address, wherein the authorization codes are renewed by renewing the coordinate address each time commands are transmitted from the transmitting end.

The command authorization method can also be configured such that the authorization information is abstracted from a plurality of the authorization codes stored in the received commands.

The command authorization method can also be configured such that arguments in the received commands are encrypted with either the authorization codes or a key generated from the authorization codes.

The command authorization method can also be configured such that the authorization information is generated by abstracting the authorization code stored in the received commands and arraying the authorization codes in time sequence, and executing commands in accordance with the received commands if the authorization information coincides with the collating information.

The command authorization method can also be configured such that the authorization information is generated by abstracting the authorization codes stored in the received commands and arraying the authorization codes in time sequence, and if the authorization information coincides with the collating information, adding/modifying arguments in the received commands and executing commands in accordance with the received commands.

The command authorization method can also be configured such that wherein signals between transmission and reception are set to predetermined state if the authorization codes stored in the received commands are abstracted and execution of commands received in time sequence is terminated while under way.

The command authorization method can also be configured such that the authorization codes stored in the received commands when abstracted are stored in a predetermined memory area.

In accordance with the present invention, configurations such that specific commands execute based upon authorization information contained in ordinary commands are disclosed. The authorization information is made difficult to parse, enabling high security to be maintained.

The foregoing and other objects, features, aspects and advantages of the present invention will become more

BRIEF DESCRIPTION OF THE DRAWINGS

FIG. 8 is a flow-chart illustrating a parse/collate/ authorize control routine according to the third embodiment;

DETAILED DESCRIPTION OF THE PREFERRED EMBODIMENTS

A first embodiment of the present invention will be explained with reference to the drawings.

Figure 1:
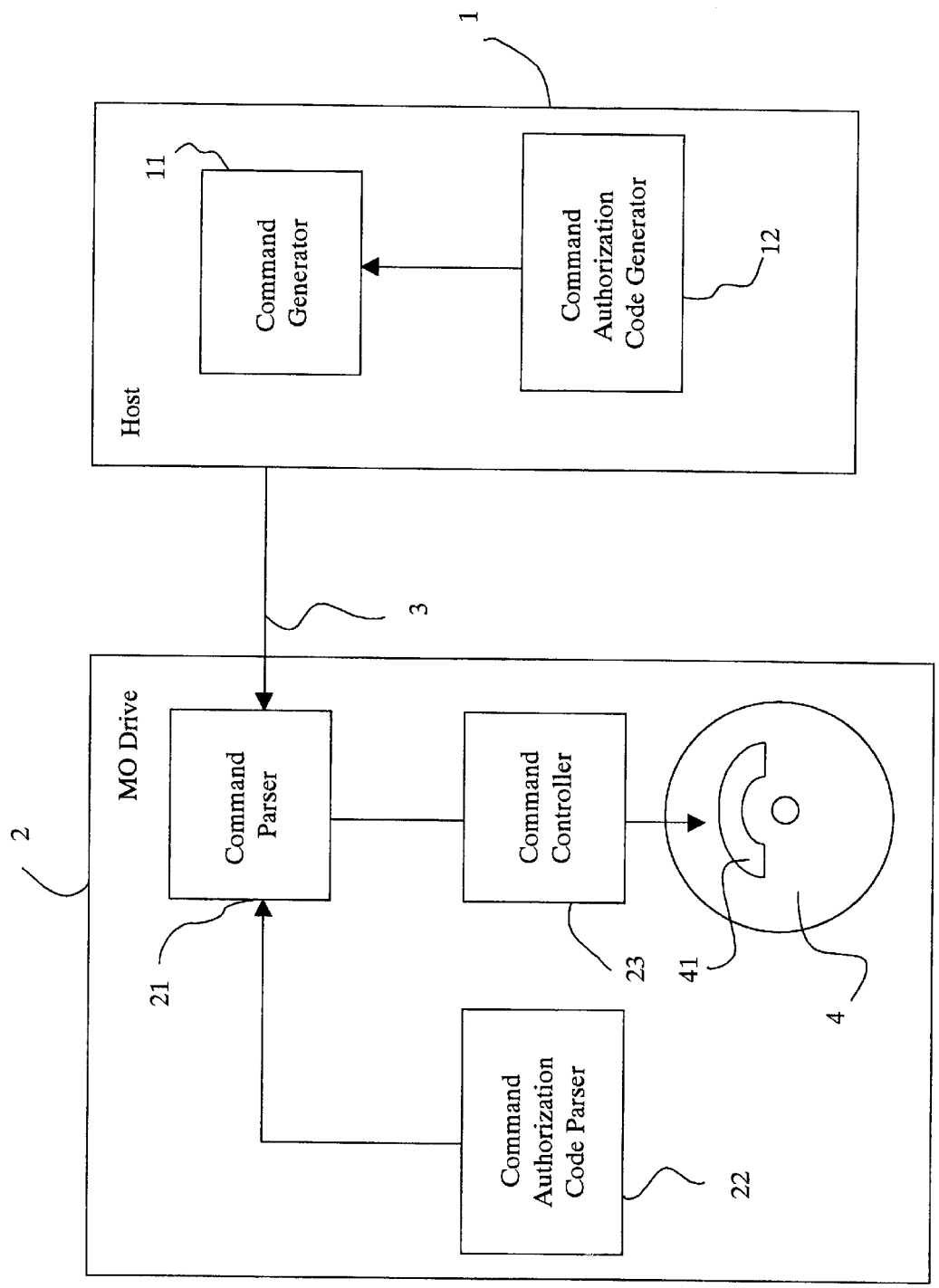
FIG. 1 is a schematic block chart illustrating a host computer and peripheral recording device configured according to the present invention.

FIG. 1 is a schematic block diagram illustrating an apparatus configuration. Herein, an instance is given in which a personal computer is connected to a magneto-optical (MO) drive by a SCSI cable.

In FIG. 1, a host 1 and an MO drive 2 are connected via a data bus 3. The host 1 is provided with a CPU, a ROM, a RAM and various interfaces, and is a so-called personal computer. The host 1 includes a command generator 11 and a command authorization code generator 12. The command generator 11 generates various commands that are transmitted to the MO drive 2. The command authorization code generator 12 generates authorization codes for appending to authorization information wherein commands generated in the command generator 11 are specific commands.

The MO drive 2 drives a magneto-optical disk 4, and in accordance with commands transmitted from the host 1 writes electronic data onto, or reads electronic data stored in, the magneto-optical disk 4. The MO drive 2 is also provided with a CPU, a ROM, a RAM and input-output interfaces. The MO drive 2 includes a command parser 21, a command authorization code parser 22, and a command controller 23. The command parser 21 parses commands, including arguments (actual parameters) that they contain, transmitted from the host 1 and issues corresponding access commands. Wherein an authorization code is attached to the command transmitted from the host 1, the command authorization code parser 22 parses the authorization code, collates it with collating information, and transmits the collated result to the command parser 21. The command controller 23 performs control functions such as reading electronic data from or writing electronic data to the magneto-optical disk 4, in accordance with commands issued from the command parser 21.

A security area 41 defined in the magneto-optical disk 4 is normally inaccessible by a user, but the content of the security area 41 is made accessible only if the command parser 21 issues a specific command. In the host 1, in order that the command parser 21 issue a specific command, the specific command is assigned a relation to a specific authorization code and transmitted.

Concrete embodiments of the present invention are described below.

In a first embodiment, an instance is illustrated in which an authorization code is generated based on random numbers.

Figure 2:
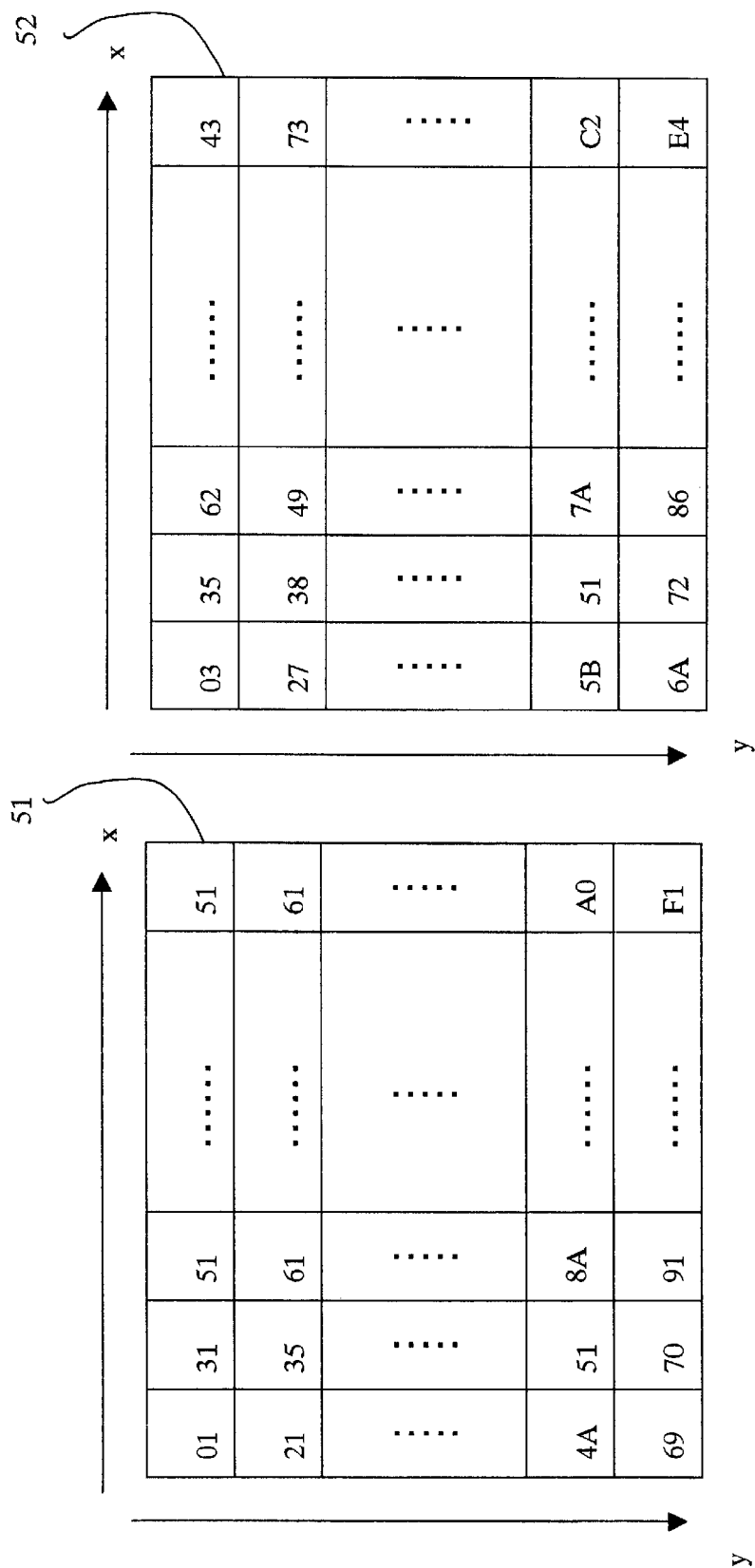
FIG. 2 is chart illustrating two random number series tables.

Prepared in the host 1 and the MO drive 2 in common are two random number series tables 51 and 52 as shown in FIG. 2. The table number (A) of the random number series tables 51, 52 is 0 and 1 respectively. The random number series tables 51, 52 are each provided addresses in two-dimensional coordinates, and random numbers of 1-byte that are expressed in base 16 are stored in respective addresses indicated with an address pointer $(X_i, Y_j)$.

Figure 3:
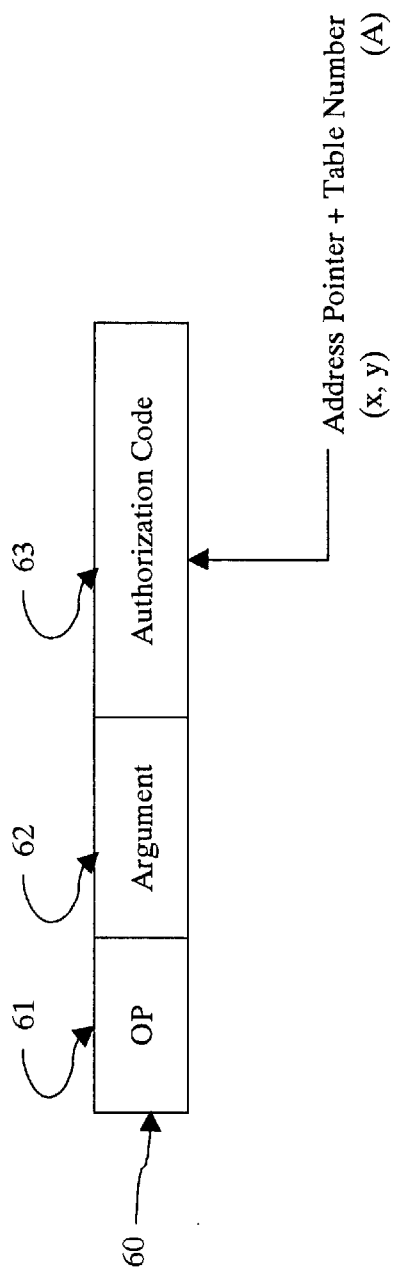
FIG. 3 is a diagram depicting a command utilized in a first embodiment of the present invention.

In the host 1, the command generator 11 generates a command 60 as shown in FIG. 3. The command 60 is constituted from an operation (OP) code 61, an argument 62 that relates to the OP code 61, and an authorization code 63 that is stored in a portion of an operand of the command 60. The authorization code 63 is generated by the command authorization code generator 12. Herein authorization code 63 is the table number (A) indicating which between the random number series tables 51, 52 is selected, and an address pointer (x, y) indicating coordinates from the selected random number series table.

Figure 4:
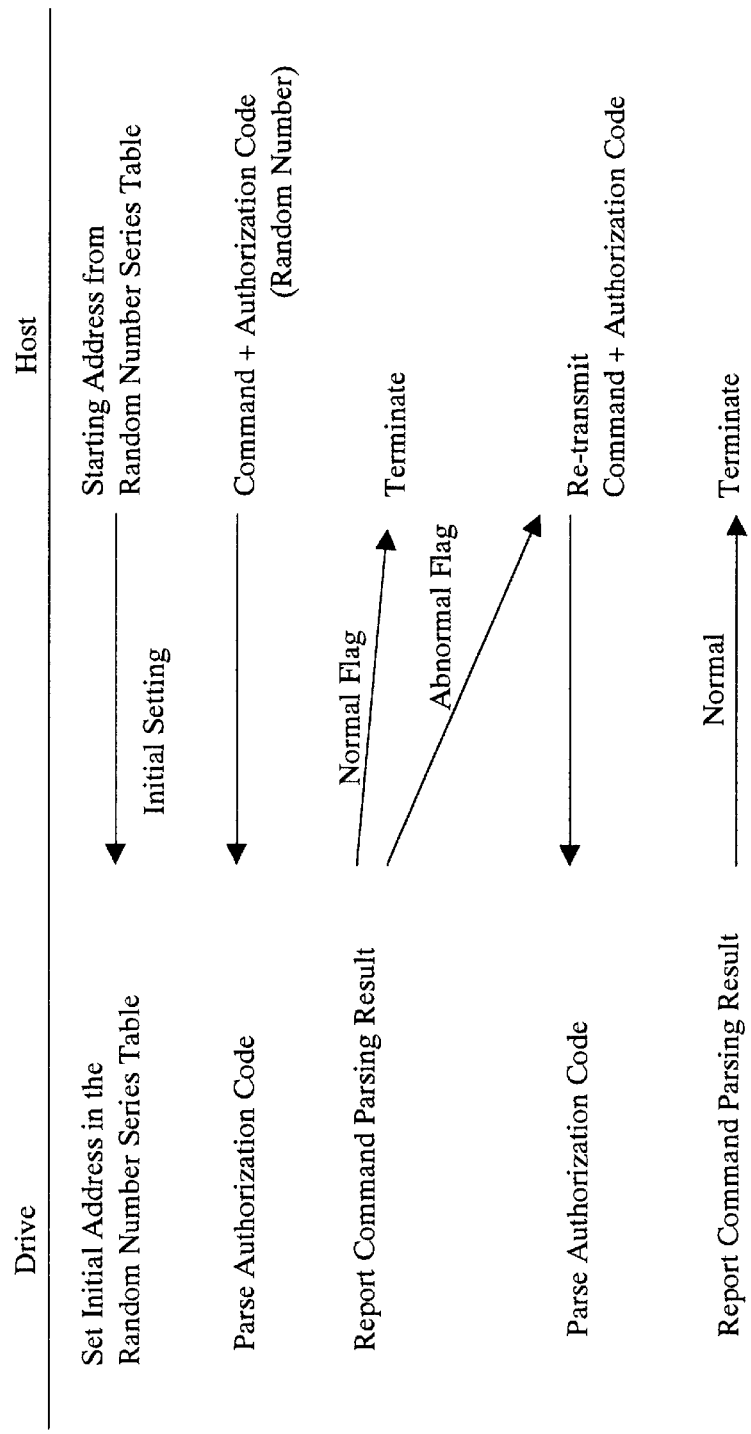
FIG. 4 is a chart illustrating signal flow between the host computer and the peripheral device in the first embodiment.

Utilizing the random number series tables 51, 52 accordingly, transmission/reception of a command to which an authorization code is attached is executed in a procedure as illustrated in FIG. 4.

First, the host 1 transmits a starting address in the random number series table as an initial setting. In the MO drive 2, receiving the starting address sets the initial address in its random number series table. Whereupon the host 1 transmits a specific command, the command authorization code generator 12 generates an authorization number that is from a table number (A) and an address pointer (x, y). Further, the authorization code generator 12 generates the command 60—to which the authorization code 63 is attached ("authorization code-attached command 60" below)—that is transmitted to the MO drive 2. The authorization code-attached command 60 is the authorization number appended to an ordinary command.

In the MO drive 2, the authorization code 63 contained in the command 60 operand is parsed, and a random number value from the random number series table based on the authorization code 63 is compared with the random number value from the current address pointer on the MO drive 2 end. Wherein the result is agreement, a report to the effect that the command parsing result was normal is transmitted to the host 1, and in the host 1 the process is ended. Further, in the MO drive 2 a specific command based on the command 60 is issued, and this carries out a control function on the magneto-optical disk 4. Wherein the command parsing result is non-agreement of the random number values, an abnormal flag is transmitted to the host 1. Whereupon the abnormal flag is received on the host 1 end, an authorization code-attached command 60 is generated and transmitted to the MO drive 2 a second time. In the MO drive 2 the authorization code-attached command 60 is received, and repeats operations likewise as with the above noted.

Wherein thus configured, the authorization code is each time updated whenever the host 1 transmits an authorization code-attached command 60 to the MO drive 2. Therefore, unless a third party was to monitor all the transmitted commands in a time-series fashion, it would be difficult to get the specific commands to issue, which enables the configuration to maintain a high level of security.

In the above-described embodiment, the authorization codes are generated from random numbers utilizing two random number series tables. Nonetheless, configurations such that the authorization codes are generated utilizing only one or three or more random number series table(s) are also possible.

An instance in which an argument attending a command is encrypted according to a specific key will be illustrated as a second embodiment.

Figure 5:
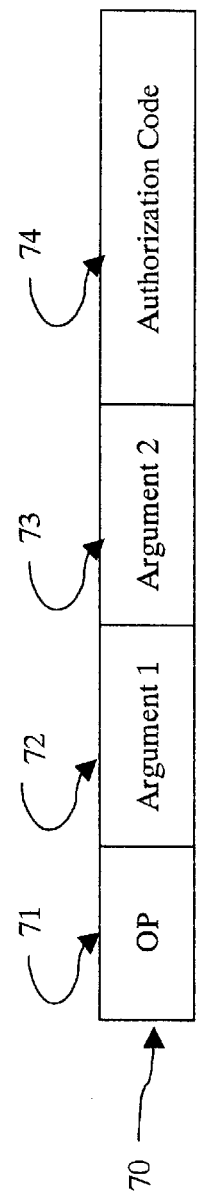
FIG. 5 is a diagram depicting a command utilized in a second embodiment of the present invention.

As shown in FIG. 5, the host 1 generates an authorization code (74)-attached command 70. The command 70 includes an operation (OP) code 71, a first argument 72 encrypted according to a specific key, a second argument 73, and an authorization code 74. The authorization code 74 can be a code such as the above-described code generated from random number series tables, having a table number (A) and an address pointer (x, y). The first argument 72 is encrypted, as a key, with a random number corresponding to the random number series table that is indicated by the authorization code 74.

Figure 6:
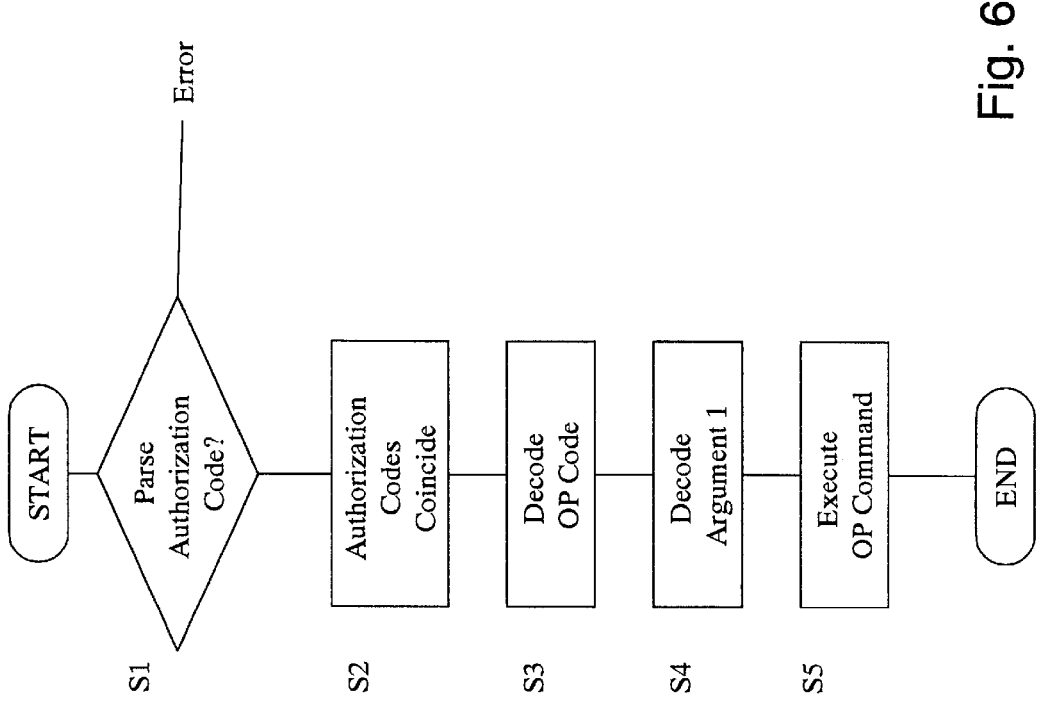
FIG. 6 is a flow-chart illustrating a parse/collate/ authorize control routine according to the second embodiment.

Operations on the MO drive 2 end in which a command 70 as such is received will be explained according to the FIG. 6 flow-chart.

In step S1, the authorization code 74 is parsed. The parsed value is collated with the random number value according to the current address pointer in reference to the random number series table. Herein, if the values do not agree, an abnormal flag is transmitted to the host 1 end, and an error routine is carried out. If the values agree, the operations proceed to step S2. In step S2, a decryption key is generated based on the authorization code 74, and is stored in a predetermined area.

In step S3, the OP code 71 is decoded. In step S4, the first argument 72 is decrypted by the decryption key generated based on the authorization code 74. In step S5, a resultant OP command according to the decoded OP code 71 and the decrypted first argument 72 is executed.

In the second embodiment, encrypting the first argument 72 makes it possible to maintain higher security.

Likewise encrypting and storing the second argument 73 is also possible.

An instance in which a plurality of authorization codes is utilized will be explained as a third embodiment.

Figure 7:
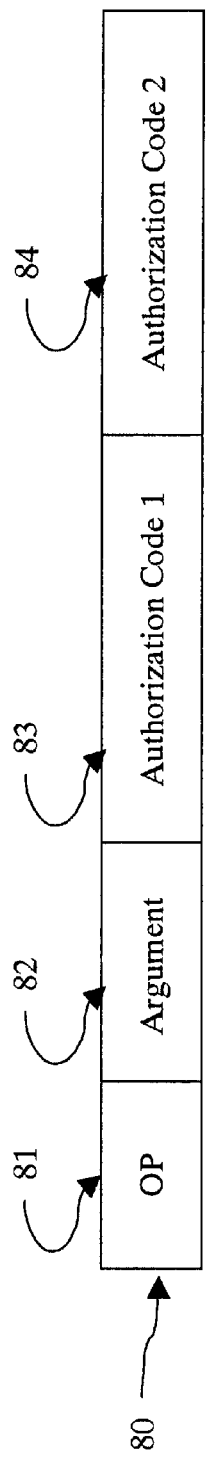
FIG. 7 is a diagram depicting a command utilized in a third embodiment of the present invention.

As shown in FIG. 7, the host 1 generates an authorization code (83)-attached command 80. The authorization code-attached command 80 is configured by an operation (OP) code 81, an argument 82, a first authorization code 83 and a second authorization code 84. The first and second authorization codes 83 and 84 are configured to enable the generation from the two of an actual authorization code for authorizing commands. One example would be a configuration such that the next address pointer for the above-described random number series table is generated from the two authorization codes. Another example is to configure the two authorization codes such that between them one has encrypted information, and the other has a decryption key that decrypts the encrypted information.

Operations on the MO drive 2 end in which a command 80 as such is received will be explained according to the FIG. 8 flow-chart.

Step S11 reads the first and second authorization codes 83 and 84. In step S12, an actual authorization code is generated from the first and second authorization codes 83 and 84. For example, based on the two authorization codes 83 and 84, an actual authorization code is generated that refers to the random number series table (is an address pointer), or by which one of the authorization codes is decrypted by the other. In step S13, the generated actual authorization code is parsed. If its parsed values do not result in agreement, an abnormal flag is transmitted to the host 1 end, and an error routine is carried out. If the values agree, the operations proceed to step S14.

In step S14, the OP code 81 is decoded. In step S15, the resultant command is executed.

According to the third embodiment, it would be difficult for a third party to come by an algorithm that would generate the actual authorization code from the first and second authorization codes. Thus still higher security can be maintained.

A situation in which specific commands issue according to a command string received in a succession will be explained as a fourth embodiment.

Figure 9:
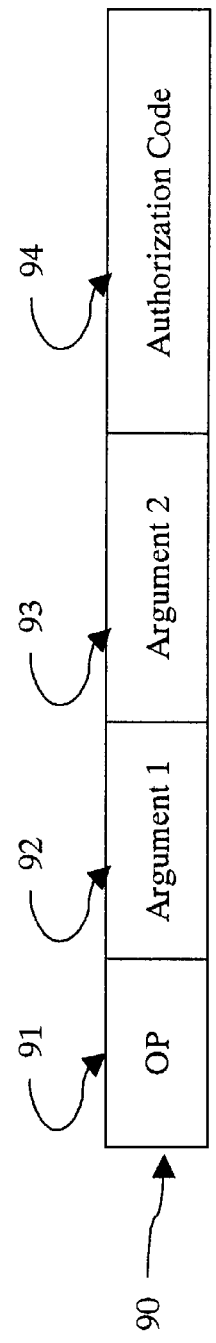
FIG. 9 is a diagram depicting a command utilized in a fourth embodiment of the present invention.

As shown in FIG. 9, the host 1 generates an authorization code (94)-attached command 90. The authorization code-attached command 90 is configured by an operation (OP) code 91, a first argument 92, a second argument 93 and an authorization code 94.

In the MO drive 2, when plural commands of a string have been received, whether the respective authorization codes 94 are in a specific pattern is discriminated. The configuration in the MO drive 2 is such that specific commands will issue only wherein the specific pattern exists.

Figure 10:
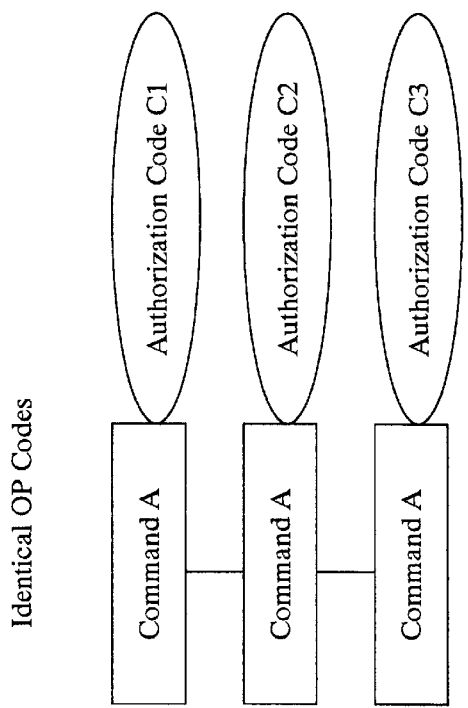
FIG. 10 is chart depicting one succession of receiving commands according to the fourth embodiment.

For example, the configuration can be such that wherein three identical commands A are received in succession a specific command issues if the authorization codes stored in the commands are in a set pattern. As shown in FIG. 10, wherein three identical commands A are received in succession, authorization codes C1, C2 and C3 stored in the respective commands are abstracted. If this authorization code string collates with a table previously arranged in the MO drive 2, then the specific command issues.

Figure 11:
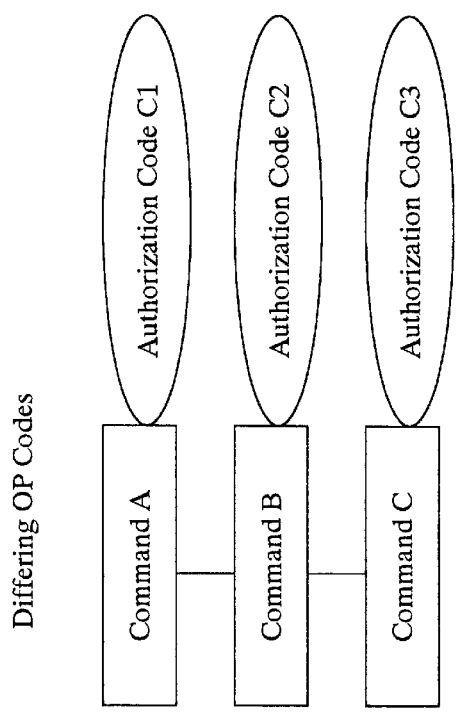
FIG. 11 is chart depicting another succession of receiving commands according to the fourth embodiment.

A further configuration, as shown in FIG. 11, can be such that wherein differing commands A, B and C are received in sequence, and wherein the authorization codes in the commands are in a set pattern, a specific command issues. As shown in FIG. 11, wherein the differing commands are received in the sequence, authorization codes C1, C2 and C3 stored in respective commands are abstracted. If this authorization code string collates with a table previously arranged in the MO drive 2, then the specific command issues.

Accordingly, for a specific command to issue, plural commands and authorization codes are necessary, which thus can prevent illegitimate control commands.

A configuration is possible such that after plural commands have been received, in case execution of the commands is terminated midway, the authorization codes stored in the MO drive 2 and its cache are cleared. This accordingly prevents the authorization codes from being stolen when the commands are received, even if they are hacked.

The MO drive 2 can also be configured such that the authorization codes stored in the commands received in succession are saved in sequence as audit information. In this case, from the array of the authorization codes or from their number it is possible to know whether there has been illegitimate access to the MO drive 2.

The invention as described in each of the above embodiments can be applied to a digital videodisk (DV), a mini disk (MD), a floppy disk (FD), a hard disk (HD) or other recording media in lieu of the magneto-optical disk (MO).

Various details of the present invention may be changed without departing from its spirit nor its scope. Furthermore, the foregoing description of the embodiments according to the present invention are provided for illustration only, and not for the purpose of limiting the invention as defined by the appended claims and their equivalents.

What is claimed is:

1. A method of authorizing commands transmitted from an electronic data command generator to an electronic data recording medium drive, comprising:

generating a non-repeating authorization code to store in each commands transmission from a random number series table having a coordinate address; and by renewing the coordinate address with each commands transmission from the electronic data command generator to the electronic data recording medium drive;

abstracting, in the electronic data recording medium drive, authorization information from the non-repeating authorization code stored in each received commands transmission;

comparing, in the electronic data recording medium drive, the authorization information with collating information based upon a synchronized coordinate address of a random number series table shared with the electronic data command generator; and executing the received commands in the electronic data recording medium drive, if the authorization information coincides with the collating information.

2. A command authorization method as set forth in claim 1, wherein the authorization information is abstracted from a plurality of the authorization codes stored in the received commands.

3. A command authorization method as set forth in claim 1, wherein arguments in the received commands are encrypted with the authorization code.

4. A command authorization method as set forth in claim 1, wherein arguments in the received commands are encrypted with a key generated from the authorization code.

5. A command authorization method as set forth in claim 1, wherein a plurality of authorization codes are generated and stored in the commands transmission, and the authorization information is generated by abstracting the authorization codes stored in the received commands and arraying the authorization codes in a time sequence; and if the authorization information coincides with the collating information, commands based on the received commands are executed.

6. A command authorization method as set forth in claim 5, wherein:

the authorization codes stored in the received commands are abstracted therefrom; and the authorization codes are stored in a predetermined memory area.

7. A command authorization method as set forth in claim 1, wherein if the authorization information coincides with the collating information, the method further comprising adding/modifying arguments in the received commands and executing commands based on the received commands.

8. A command authorization method as set forth in claim 1, wherein a plurality of authorization codes are generated and stored in the commands transmission, and signals in transmission and reception between the electronic data command generator and the electronic data recording medium drive are set to a predetermined state, if the authorization codes stored in the received commands are abstracted and execution of commands received in a time sequence is terminated while under way.

9. A system, comprising:

a host comprising a programmed computer processor generating a control command, generating a non-repeating command authorization code from at least one random number series table having coordinate addresses, appending the authorization code to the control command to produce an authorization code-attached control command, and transmitting the authorization code-attached control command to a recording device via an interface; and an electronic data recording device in communication with the host via the interface and abstracting authorization information from the non-repeating authorization codes in the received authorization code-attached control command based upon coordinate addresses of at least one host shared random number series table synchronized with the host, comparing the authorization information with collating information, and executing the control command, if the authorization information coincides with the collating information.

* * * * *